United States Patent [19]

Husted

[11] Patent Number: 4,750,850

[45] Date of Patent: Jun. 14, 1988

[54] COLLET RELEASE MECHANISM FOR MILLING MACHINE

[76] Inventor: Royce H. Husted, 711 Lakeside Dr., Wheaton, Ill. 60187

[21] Appl. No.: 45,838

[22] Filed: May 1, 1987

[51] Int. Cl.[4] .............................................. B23C 5/26
[52] U.S. Cl. ................................. 409/233; 408/239 R
[58] Field of Search ............... 409/233, 231; 408/238, 408/239 R, 239 A; 229/8

[56] References Cited

U.S. PATENT DOCUMENTS

| | | | |
|---|---|---|---|
| 3,680,437 | 8/1972 | Cravens | 409/233 |
| 3,898,911 | 8/1975 | De Caussin | 409/233 |
| 4,382,730 | 5/1983 | Reinisch | 409/233 |
| 4,511,295 | 4/1985 | Razdobreev | 409/233 |

Primary Examiner—William R. Briggs
Attorney, Agent, or Firm—Nicholas A. Camasto

[57] ABSTRACT

A collet attachment and release mechanism for a vertical milling machine includes a movable plate vertically supporting a pneumatic, hand-held, bidirectional, rotary impact wrench above the drive head of a drawbar. The movable plate is spring-biased to keep the socket of the impact wrench out of engagement with the drive head and is manually movable vertically along parallel guide posts by means of a handle. The handle is rotatable about one of the posts to actuate a pivotally mounted switch plate on the impact wrench for rotating the socket in a counter-clockwise or clockwise direction. The mechanism may also be used as a hammer to impart a sharp blow to the drive head to free a collet that sticks in the spindle.

4 Claims, 3 Drawing Sheets

COLLET RELEASE MECHANISM FOR MILLING MACHINE

BACKGROUND OF THE INVENTION AND PRIOR ART

This invention relates generally to milling machines and specifically to means for rapidly and easily enabling tool changes to be made in vertical milling machines. Vertical milling machines usually found in machine shops are large structures that precisely support a cutting tool adjacent a movable table on which material to be milled is positioned. The tool is coupled, through a split collet, to a hollow spindle that is rotatably mounted in the machine housing. (The spindle is also adapted for limited vertical movement.) The spindle is coupled to a drive motor through a pulley arrangement to permit a variety of different spindle speeds. The split tool-holding collet has a tapered body that cooperates with a tapered opening in the spindle end to secure it in the spindle. The collet also has a threaded end that engages a so-called drawbar that passes through the hollow spindle. The drawbar generally has a hexagonally-shaped drive head that is accessible at the top of the milling machine. The drive head is turned by means of a wrench or the like to draw the collet up into the tapered opening at the lower end of the spindle. The collet, in turn, has an opening in which a cutting tool is positioned. As the collet is drawn into the spindle by the drawbar, the tapered surfaces on the collet and spindle cooperate to firmly secure the tool and collet in the spindle. This arrangement is well-known in the art.

The drive head of the drawbar is difficult to reach. Consequently, tool changing is, at best, inconvenient. Installation of a new tool is generally easier than removal, because the collet is not stuck in the spindle, a situation that often occurs in practice. The new tool is merely inserted in the collet, which is held in the spindle opening while the drive head of the drawbar is turned to draw the collet into tight frictional engagement with the spindle. A minor difficulty is that the spindle brake, which is mechanically operable to rapidly stop a rotating spindle, may require engagement to keep the spindle stationary as the drawbar is turned.

Removal of a tool is, however, a much more difficult matter. Since the collet and tool are drawn up into the spindle very tightly, it is often difficult to break the collet free from the spindle to remove a tool. Turning of the drive head merely results in the drawbar being unthreaded from the collet and protruding above the top of the milling machine. The practice is to physically hammer on the drive head to force the collet out of engagement with the spindle. While this procedure is generally satisfactory in breaking the collet loose from the spindle, it is inconvenient and time-consuming and often performed "blind," that is, the machinist cannot see the drawbar drive head since the milling machine stands quite tall.

Tool changing thus involves having a suitable wrench available to enable the drive head of the drawbar to be turned for tightening or loosening the collet in the spindle. A hammer for breaking the drawbar loose as above-mentioned is also desirable, although the wrench is often used as a hammer. In many instances, a machinist will perform operations with the wrong sized tool because of the difficulty and time to change tools. Thus, a machinist may take multiple cuts with a small tool rather than taking a large cut with a correct size tool and then changing to the smaller tool for further machining operations. All of these factors add to the inconvenience to the machinist and, of course, to the cost of the job.

An automatic mechanism for tightening and loosening tool collets is available and consists of an air-operated, rotary impact wrench that is mounted in a suitable housing on top of the vertical milling machine, with the socket of the impact wrench engageable with thread drive head of the drawbar. The mechanism generally works but is very expensive. It also has a significant disadvantage in that the very expensive top casting of the vertical milling machine can easily be damaged if the tool and collet are vertically obstructed while loosening the collet. This is because the drive head of the drawbar is levered (through the housing) against the top casting of the milling machine and, as the drawbar is unthreaded from the collet, the collet is driven downward. Any obstruction, such as work positioned under the tool, can easily result in a very large force being applied to the top casting of the milling machine. This situation has caused the destruction of a number of such castings, with the attendant loss of the machine availability and cost of repair.

With the apparatus of the invention, a small rotary impact tool is manually moved into engagement with the drive head of the drawbar and actuated under control of the operator. Not only is the danger of cracking the top casting eliminated, but much better control of the tool changing process is obtained. If a sticking collet is encountered, the impact tool may be easily used as a hammer by rapidly bringing it down into engagement with the drive head.

Another problem with the automatic mechanism is the potential danger it poses for the operator. The automatic apparatus is push-button operated and it is possible to inadvertently operate the mechanism while one's hand is positioned under the cutting tool, with potentially disastrous consequences. This potential for very serious injury, coupled with its high cost and susceptibility to causing significant damage to the milling machine, has precluded the automatic tool changing device from achieving any substantial success in the marketplace.

OBJECTS OF THE INVENTION

A principal object of the invention is to provide a novel tool changing assembly for a vertical milling machine.

Another object of the invention is to provide a semi-automatic tool changing assembly for a vertical milling machine that eliminates the danger of damaging the machine.

A further object of the invention is to provide a safe, semi-automatic tool changing mechanism for a vertical milling machine.

DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
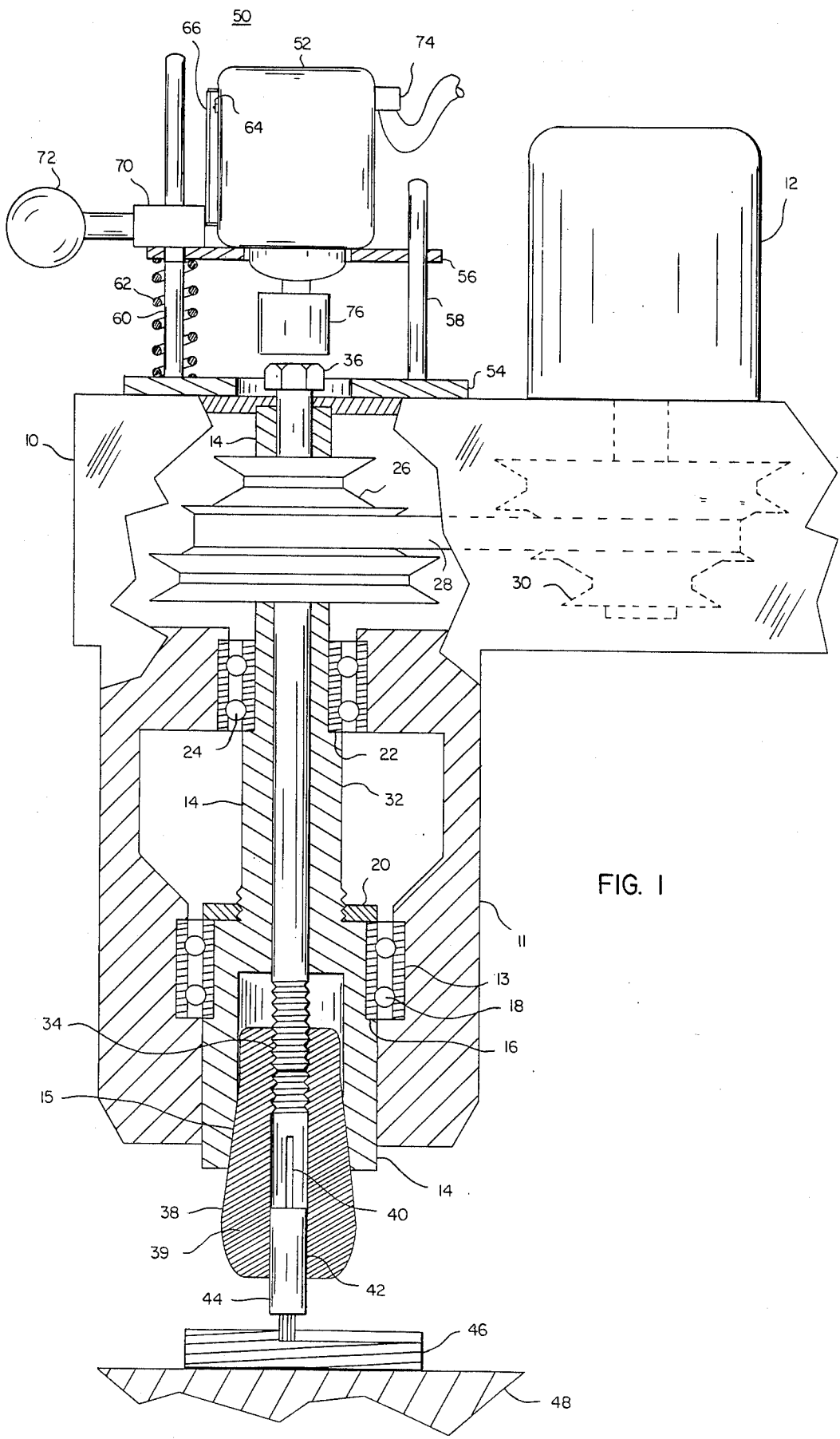
FIG. 1 is a partial, sectional view of a vertical milling machine head and the invention.

Referring to FIG. 1, an upper housing portion 10 of the head of a vertical milling machine is shown partially broken-away and in partial cross-section to reveal a vertically mounted drive motor 12 supported atop the housing portion 10 for driving a vertically rotatable spindle 14 supported therein. Spindle 14 has a plurality of shoulders 16 and 22 and a locking ring 20 cooperable with a pair of bearings 18 and 24 and interior channels, such as channel 13, in housing 10 for confining spindle 14 to rotational movement about a vertical axis. It will be appreciated that the details of construction of the vertical milling machine are not only well-known in the art, but are of no significance to the present invention and consequently the showing is somewhat schematic in nature. For example, spindle 14 is generally also adapted for limited vertical movement by means of a handle and mechanism (not shown) for positioning the cutting tool with relation to the work to be milled. These construction details are of no consequence to the invention and are omitted for the sake of clarity.

At the upper end of spindle 14 is a multiple pulley 26 that is affixed to the spindle by any suitable means, such as a set screw. Pulley 26 cooperates, by means of a belt 28, with another multiple pulley 30 that is shown in dashed lines and which is driven by motor 12. Thus, in response to rotational movement of the shaft of motor 12, pulley 30 rotates and, via belt 28, turns pulley 26 which imparts rotational movement to spindle 14. The speed of rotation of spindle 14 may be adjusted by movement of the belt 28 to different diameters of the pulleys 26 and 30. The milling machine also includes a brake mechanism for applying friction to spindle 14 to bring it to a rapid stop. This mechanism is also not illustrated since it is of no interest to the present invention.

The lower end of spindle 14 defines an enlarged cylinder with an inner, outwardly flaring or tapered, end 15 adapted for reception of the tapered body of a split collet 38. Collet 38 is of conventional construction and includes a small, cylindrical end 39 having an interiorly threaded portion and a larger end for receiving a tool 44. The large end has one or more slots 40 to enable tool 44 to be grasped by squeezing the split end of collet 38 as the collet is drawn into the tapered end of spindle 14. Release of the collet from the spindle readily frees the tool since the split ends of the collet are permitted to return to their normal outwardly directed positions.

A cylindrical opening extends the length of spindle 14 and an elongated cylindrical drawbar 32 passes therethrough. One end of drawbar 32 terminates in a threaded portion 34 adapted to engage threaded end 39 of collet 38 and the other end terminates in a drive head 36, which may be hexagonal-shaped. Essentially, drawbar 32 is a very long bolt with a head at one end and a threaded portion at the other. The drawbar 32 is movable within spindle 14 to enable squeezing and loosening of collet 38 with respect to tool 44 by turning drive head 36 in a clockwise or counter-clockwise direction.

Positioned directly beneath the tool 44 is a workpiece 46 that is supported on a table 48, only portions of which are illustrated. As is well-known, in vertical milling machines, the table and work are movable relative to the head of the vertical mill.

The collet attachment and release mechanism of the invention is generally identified by reference numeral 50. It includes a conventional, small, hand-held, bidirectional, rotary impact wrench 52 that is supported on a fixed plate 54 affixed to the top of housing 10 of the milling machine by any suitable means. A spaced parallel movable plate 56 supports impact wrench 52 above and in vertical alignment with drive head 36 of drawbar 32. Impact wrench 52 is rigidly attached to movable plate 56 by supports 78. A suitably configured socket 76 is attached to the shaft of impact tool 52 for mating engagement with drive head 36. A pair of upright guide posts 58 and 60 confine movable plate 56 and impact tool 52 to vertical movement with respect to fixed plate 54 (and housing 10 and drive head 36). In particular, an elongated bearing tube 64 is affixed to movable plate 56 and is slidable over guide post 60, as shown by arrow A, while the other end of movable plate 56 has an aperture therethrough to enable it to slide over guide post 58. A compression spring 62 is captivated between fixed plate 54 and movable plate 56 and exerts an upward force on movable plate 56 to maintain impact wrench 52 in an elevated position in which socket 76 and drive head 36 are disengaged.

Figure 2:
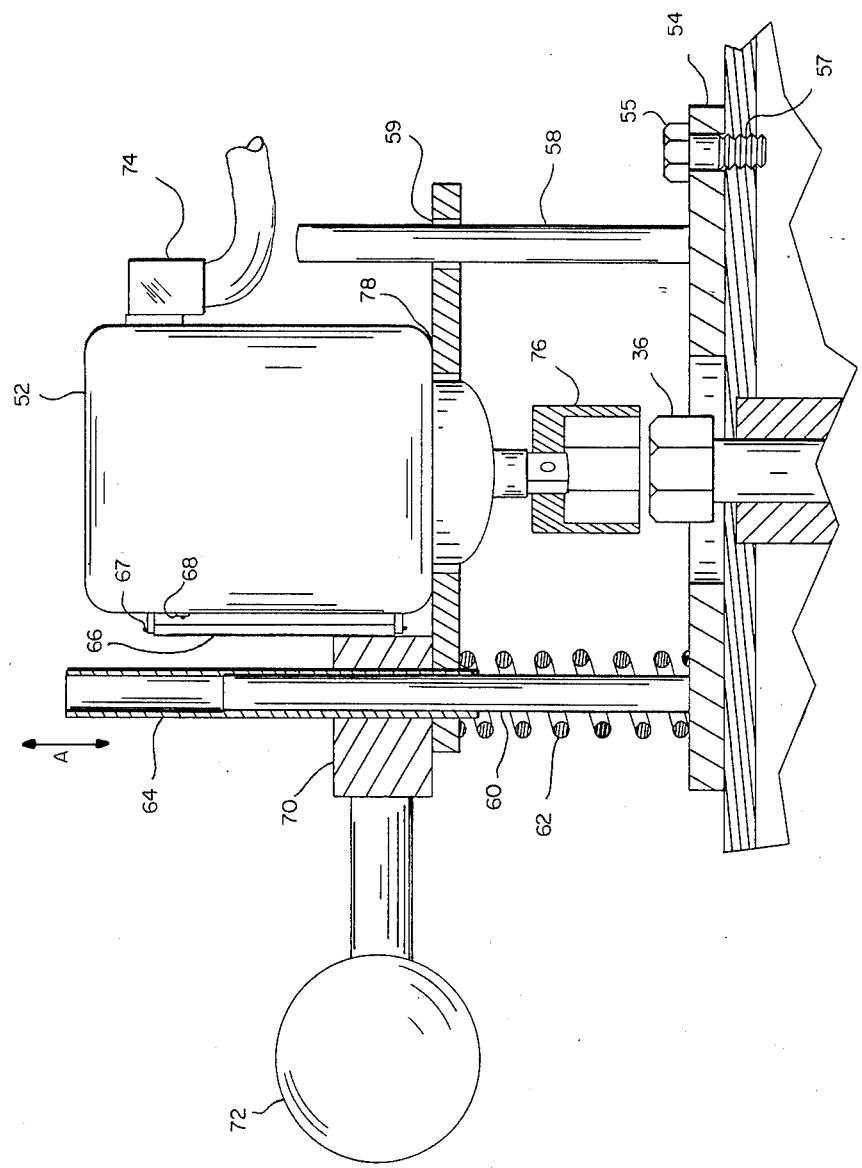
FIG. 2 is an enlarged view of the inventive apparatus.
Figure 3:
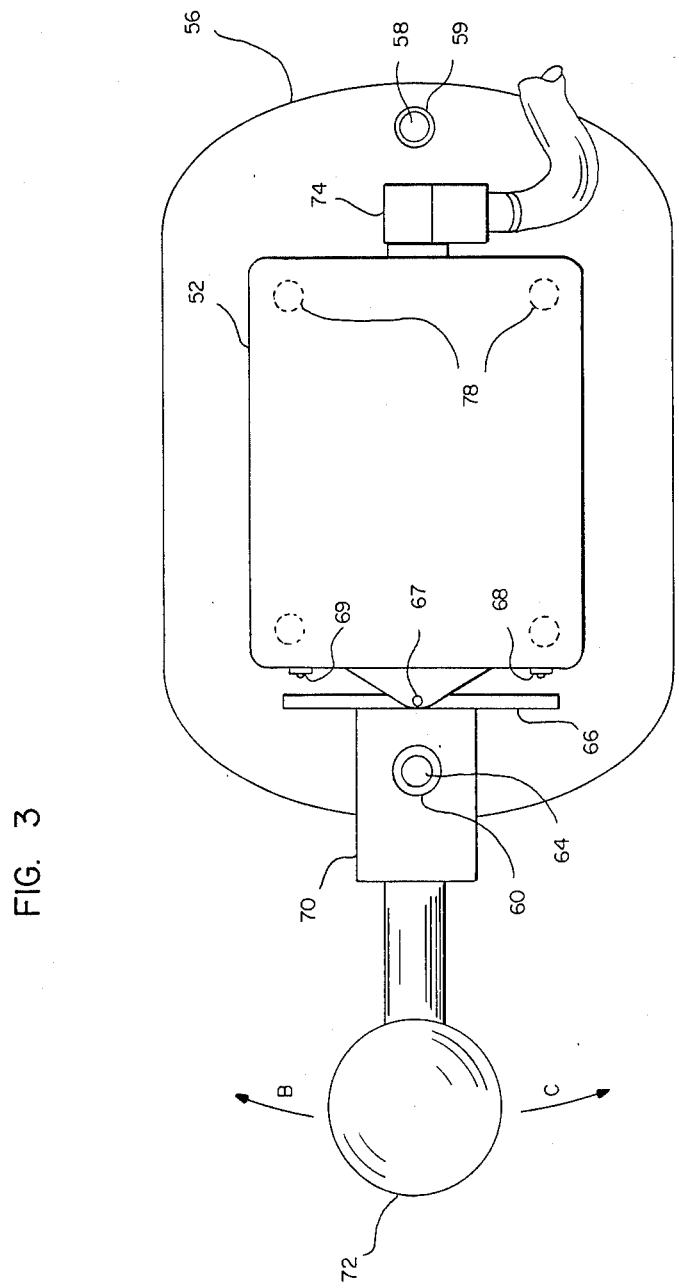
FIG. 3 is an enlarged top view of the apparatus of FIG. 2.

As best seen in FIGS. 2 and 3, impact wrench 52 has an elongated switch plate 66 pivotally mounted thereon such that when it is pivoted or rocked about its axis, one of a pair of switches 68 and 69 is engaged for driving the shaft of impact tool 52 clockwise or counter-clockwise. Switch plate 66 is pivoted by an actuation block 70 which is mounted for rotational movement about bearing tube 64 by means of a handle 72. A suitable locking clip 73, or the like, keeps actuation block 70 (and handle 72) from moving vertically independent of bearing tube 64. Thus vertical movement of handle 72 brings the impact wrench 52 into engagement with the drawbar and rotational movement of handle 72 actuates the wrench.

An air inlet fitting 74 is coupled to a hose that is supplied with compressed air from a suitable source. As best seen in FIG. 2, bearing means may be used in movable plate 56 to facilitate sliding movement with respect to guide post 58. Such bearing means are, however, not indispensable. In FIG. 3, switches 68 and 69 and their relationship to pivotally mounted switch plate 66 are more clearly shown. Movement of handle 72 in a clockwise direction, as indicated by arrow B, or in a counter-clockwise direction, as indicated by arrow C, will result in closure of the corresponding one of switches 69 and 68 for operating the shaft of impact wrench 52 in a clockwise or counter-clockwise direction to either thread or unthread the drawbar and the collet.

In operation, a new tool is placed in collet 38 and collet 38 is placed within the bottom portion of spindle 14. In practice, a key and keyway arrangement is used on spindle 14 and collet 38 to assure proper engagement. While the collet and tool are being held in position, the operator brings handle 72 down, against the action of bias spring 62, to engage socket 76 of impact wrench 52 with drive head 36. Slight movement of handle 72 to the operator's left operates impact wrench 52 in a clockwise direction to threadingly engage drawbar 32 with collet 38. As drawbar 32 is turned, collet 38 is drawn up into spindle 14 against inside tapered surface 50 which securely locks tool 44 into collet 38 and collet 38 into spindle 14. The amount of torque applied is a function of the air pressure and the impact wrench 52 and may be set in accordance with well-known techniques. In any event, the impact wrench will stall when the collet is firmly set in the spindle. Release of handle 72 causes movable plate 56 to be driven upwardly by spring 62 to disengage impact wrench 52 and socket 76 from drive head 36. The milling machine may now be operated in a normal manner.

When tool 44 is to be changed, handle 72 is pulled down to engage socket 76 with drive head 36. Movement of handle 72 to the operator's right closes switch 68 causing impact wrench 52 to rotate drawbar 32 in a counter-clockwise direction and unthread it from collet 38. Assuming that collet 38 binds in spindle 14, the impact tool and movable plate will be forced upwardly as the drawbar is forced up. The only opposing force is that applied by the operator to handle 72 and, thus, there is no possibility of damage to housing 10. If a stuck collet is encountered, the operator may use impact tool 52 as a hammer by physically pulling down hard on handle 72 (without actuating the switches 68 and 69). Driving the socket of impact tool 52 on the top of drive head 36 readily breaks a sticking collet 38 loose from the tapered inside surface of spindle 14. With the inventive apparatus, collet 38 may be disengaged and tool 44 released within a few seconds, and with no danger to the machine or to the operator.

The impact wrench 52 and movable plate 56 may be readily removed by lifting them off of guide posts 58 and 60. The impact tool also obviates the need for using the spindle brake during a tool change, because the mass of the spindle system is sufficiently large to permit the rapid rotational force applied by the rotary impact wrench to unthread the drawbar from the collet. It will be appreciated by those skilled in the art that the particular arrangement shown for engaging impact tool 52 with drive head 36 of the drawbar is preferred, although the apparatus could be modified to provide for pivotal engagement also. The criteria is that the impact tool be mechanically movable into engagement and capable of use in a hammer-like fashion, if required.

It is recognized that numerous modifications and changes in the described embodiment of the invention will be apparent to those skilled in the art without departing from its true spirit and scope. The invention is to be limited only as defined in the claims.

What is claimed is:

1. A manually operable collet attachment and release mechanism for a vertical milling machine having a drawbar with a drive head and a threaded end for securing a tool-holding collet in a rotatable spindle comprising:
   a pneumatic, hand-held, bidirectional, rotary impact wrench having a socket engageable with said drive head;
   mounting means, comprising a fixed plate and a movable plate, said movable plate supporting said rotary impact wrench on said milling machine in alignment with said drive head and said fixed plate being affixed to said milling machine, said mounting means including a post permitting only vertical movement of said movable plate concentric with and along the axis of said drawbar;
   upstanding means preventing torsional movement of said plate;
   a spring biasing said plates apart and normally maintaining said socket out of engagement with said drive head;
   an outwardly extending handle for moving said movable plate, against the bias of said spring, to bring said socket into engagement with said drive head;
   bearing means slidably supporting said plate on said post; and
   said handle being rotatably coupled to said bearing means for actuating said rotary impact wrench.

2. The apparatus of claim 1 wherein said bearing means is in the form of a tube fixed to said movable plate, the inner surface of said tube providing a slidable bearing surface for said post and the outer surface of said tube providing a rotatable bearing surface for said handle.

3. The apparatus of claim 2 wherein said spring is positioned around said post and exerts a force along the axis thereof.

4. A manually operable collet attachment and release mechanism for a vertical milling machine having a drawbar with a drive head and a threaded end for securing a tool-holding collet in a rotatable spindle comprising:
   a pneumatic, hand-held, bidirectional, rotary impact wrench having a socket engageable with said drive head;
   mounting means, comprising a fixed plate and a movable plate, said movable plate supporting said rotary impact wrench on said milling machine in alignment with said drive head, and said fixed plate being affixed to said milling machine, said mounting means including a first vertical post permitting only vertical movement of said movable plate concentric with and along the axis of said drawbar;
   a second vertical post affixed to said fixed plate cooperating with said movable plate for preventing torsional movement of said movable plate;
   a compression spring positioned around said first vertical post for biasing said plates apart for normally maintaining said socket out of engagement with said drive head;
   an outwardly extending handle for moving said movable plate, against the bias of said spring, to being said socket into engagement with said drive head; and
   a tubular bearing affixed to said movable plate and having an inner surface for slidably supporting said plate on said first vertical post and an outer surface for rotatably coupling said handle on said first vertical post for actuating said rotary impact wrench.

* * * * *